United States Patent
Olpp et al.

(10) Patent No.: US 7,840,598 B2
(45) Date of Patent: Nov. 23, 2010

(54) METHOD FOR DISTRIBUTING RESOURCES TO NETWORK NODES IN A DECENTRALIZED DATA NETWORK

(75) Inventors: Dieter Olpp, Munich (DE); Steffen Rusitschka, Munich (DE); Alan Southall, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 392 days.

(21) Appl. No.: 12/081,567

(22) Filed: Apr. 17, 2008

(65) Prior Publication Data
US 2008/0259939 A1    Oct. 23, 2008

(30) Foreign Application Priority Data
Apr. 18, 2007    (DE) ....................... 10 2007 018 299

(51) Int. Cl.
*G06F 17/30* (2006.01)
(52) U.S. Cl. ................. 707/791; 707/802; 707/822; 707/828
(58) Field of Classification Search .......... 707/600–831
See application file for complete search history.

(56) References Cited

U.S. PATENT DOCUMENTS
7,028,040 B1 *   4/2006   Butler et al. ....................... 1/1
2007/0288642 A1  12/2007  Oztunali et al.

FOREIGN PATENT DOCUMENTS
DE   102004050348 B3   5/2006
DE   102006011291 A1   9/2007

* cited by examiner

*Primary Examiner*—Isaac M Woo
(74) *Attorney, Agent, or Firm*—Harness, Dickey & Pierce, P.L.C.

(57) ABSTRACT

A method is disclosed for distribution of resources to network nodes in a decentralized data network. In at least one embodiment of the method keywords, which are allocated to digital resources, are mapped onto digital bit sequences. These bit sequences are modified, with the subsequent bits after a predetermined bit position, preferably being replaced by random bits. A mapping onto bit sequences is then undertaken with these modified bit sequences, with each network node being responsible for a specific range of values of indices. The resource will then be allocated the index which is produced by the mapping. The mapping in this case can be selected so that a wildcard search according to keywords is guaranteed. The outstanding feature of the method is that the resources are distributed evenly in the decentralized network and at the same time a fast wildcard search according to truncated keywords is made possible.

33 Claims, 3 Drawing Sheets

METHOD FOR DISTRIBUTING RESOURCES TO NETWORK NODES IN A DECENTRALIZED DATA NETWORK

PRIORITY STATEMENT

The present application hereby claims priority under 35 U.S.C. §119 on German patent application number DE 10 2007 018 299.8 filed Apr. 18, 2007, the entire contents of which is hereby incorporated herein by reference.

FIELD

Embodiments of the invention generally relate to a method for distributing resources to network nodes in a decentralized data network and/or to a corresponding data network, a network computer and/or a computer program product.

BACKGROUND

Decentralized data networks are used nowadays in a plurality of technical application fields. Such data networks include a plurality of network nodes which can communicate with each other. These network nodes can for example be networked computers connected wirelessly or by wires to each other in a computer network, but can also involve any other types of unit, such as measurement units or sensors in technical systems or devices, such as medical devices, power station systems, automobiles and such like. The term network node is thus to be understood here and in the rest of this document in general terms and can relate to any unit communicating within one of the above-mentioned technical fields and if necessary other technical fields.

Decentralized data networks are identified by not having any central higher-ranking network node for organization of the network but by all network nodes having an equal ranking in the data network. This enables networks to be implemented which have high failsafe capabilities, simple scalability to large numbers of nodes and which are guaranteed to be able to be implemented with lower computing capacity.

In decentralized data networks resources are administered by the individual network nodes, with the resources being distributed to the individual network nodes such that each resource is assigned an index, with the indices in their turn being divided up into ranges of values and with each network node being responsible for a specific range of values of the totality of indices. In order to conduct a search for resources in the data network, the resources are frequently characterized by one or more keywords, with the term keyword to be understood in general terms and especially also being able to include just one identifier for specification of the identity of the resource. The keyword does not thus absolutely have to be a word from which a meaning content can be deduced.

Different methods for distributing resources to the network nodes of a decentralized data network using keywords are known from the prior art. In the area of computer networks in the form of so-called peer-to-peer-networks methods for distributing the resources are especially used which guarantee an even distribution of the resources over the network nodes, which avoids overloading individual network nodes. This is achieved for example by the use of hash-functions which have a locality-destroying characteristic to the extent to which they can even assign to lexicographically closely-adjacent keywords indices which are very far removed from each other. Although such methods allow an even distribution of the load to be achieved, these methods do not allow any efficient wildcard search using truncated keywords, since, as a result of the locality-destroying characteristics, the number of peers to be searched through is not restricted by the truncation.

In addition to the methods in which the distribution of the resources uses locality-destroying hash functions, there also exist in the prior art methods in which locality-preserving functions are used for assigning indices to keywords and for the appropriate distribution of resources to network nodes. In this way, although fast and efficient wildcard searches can be performed, overloading of network nodes frequently occurs from the fact that frequently-used similar keywords are always allocated to the same peers because of the partial preservation of the lexicographic order of the keywords.

A further approach known from the prior art for even load distribution consists of giving the individual network nodes themselves the option of distributing the available resources so that approximately the same number of resources lies in each value range of indices. However in practice this leads to security problems since these strategies require the network nodes to be able to choose their indices themselves and thus a malicious network node could explicitly place itself at the point in the index space at which a specific data record is stored in order to manipulate or to destroy this data record.

SUMMARY

In at least one embodiment of the invention, a method is for distributing resources to network nodes in a decentralized data network which avoids the disadvantages described above and makes possible a wildcard search using keywords with the most even possible distribution of the resources in the data network.

At least one embodiment of the inventive method is employed in a data network which includes a plurality of network nodes, with each network node being responsible for a range of values of indices and with each resource being assigned to one or more keywords. In the method the keyword or the keywords of each respective resource are encoded in each case into a digital bit sequence (step a). In a step b) one or more modifications of the digital bit sequence(s) of a respective resource are created by a modified bit sequence being created in each case from the digital bit sequence or bit sequences, whereby, in a modified bit sequence, the bits are replaced by new bits at predetermined bit positions of the respective digital bit sequence independently of the keyword encoded in accordance with the digital bit sequence. A replacement of the bits-Independent of the keyword means in this case that the structure of the keyword, for example an alphabetical sequence of characters of the keyword, is not taken into account during replacement of the bits.

In a step c) the modified bit sequence or the totality of the modified bit sequence of a respective modification is mapped onto the indices and thus onto the value ranges of the network nodes such that, when a resource is requested from a network node by means of truncated keywords, only in one part of the decentralized data network (i.e. only for the part of the network nodes in the network) is the search conducted according to indices which correspond to the truncated keyword or keywords. In a step d) the respective resource, i.e. the resource which is assigned to the keywords, from which in step a) the digital bit sequence was encoded, is finally allocated to that index onto which a modified bit sequence or the totality of the modified bit sequences of the modification or of one of the modifications is mapped.

The method in accordance with at least one embodiment of the invention combines the option of a known wildcard search with an even load distribution, with the even load distribution being achieved by the mapping onto the indexes for guaranteeing a wildcard search not being performed with the originally encoded digital bits sequence but with a modified bit sequence in which the bits are replaced at a predetermined bit positions of the encoded bit sequence by new bits. Because the bit replacement is independent of the keywords, the locality preservation which is guaranteed by a mapping making-possible a wildcard search is reduced, whereby the load distribution is more even.

If in a data network in which the resources are distributed with the inventive method a search is now conducted for a resource of which the keywords are completely unknown, a corresponding query is similarly replaced by a wildcard search query, with this wildcard search query for each keyword containing precisely those bits which were not replaced by new bits. The result of this wildcard search query then contains the resource searched for and the search must only be made locally in predetermined network nodes for the resource. Accordingly a wildcard search query must be replaced by a wildcard search query in which for each keyword at most the first non-replaced bits are contained.

In an example embodiment of the inventive method, the bits of the respective digital bit sequence are replaced as from a predetermined bit position by new bits. The end area of a bit sequence is thus modified.

In an example embodiment of the inventive method, in step b) the bits are replaced at predetermined bit positions of the respective digital bit sequence by randomly selected bits. An independence of the bit replacement from the respective keyword is achieved in this way in a very simple manner.

In the mapping of the modified bit sequence or the totality of the modified bit sequences onto the indices of the ranges of values of the network nodes any given mappings known from the prior art can be used which at least partly make possible a locality preservation and thereby a wildcard search.

In an example variant the mapping is undertaken by a space-filling curve, for example a Hilbert curve. Such space-filling curves are sufficiently known from the prior art and are in particular described in publications [1] and [2]. In a variant of an example embodiment in this case each resource is assigned a predetermined number of keywords and the keyword or the keywords of a respective resource are encoded into digital bit sequences with a fixed bit length, with the space-filling curve having a dimension which corresponds to the predetermined number of keywords, and with the space-filling curve having an order which corresponds to the fixed bit length. In a preferred variant the space-filling curve maps the modified bit sequences onto indices in a range $[0, 2^{nb}-1]$, with n being the predetermined number of keywords and b the fixed bit length.

In a variant of an example embodiment of the inventive method the keywords each feature one or more characters from a predetermined alphabet, with each character of a respective keyword preferably being encoded as a digital bit sequence with a predetermined number of bits and the encoded characters of the respective keyword being arranged one after the other, which creates a digital bit sequence in accordance with step a) of the inventive method. If a space-filling curve is to be used for mapping onto the indices, this curve is given to some extent by the spacing's between the keywords produced by the lexicographical arrangement of the predetermined alphabet.

In a further example embodiment of the inventive method, in step b) a number of modifications are created and in step c) mapped onto indices, whereby in step d) that index is assigned the resource in accordance with one of the modifications which lies in a range of values of that network node which is the best suited network node in accordance with an optimality criterion, with the optimality criterion being selected so that an even load distribution is achieved in the decentralized data network. Preferably in this case in step d) that index is allocated to the resource which lies in the range of values of that network node which at that point has the lowest of all or at least of a part of the network nodes produced by the number of modifications. The index which is allocated in step d) to the resource is thus determined in this case by way of the greedy algorithm.

In a further embodiment of the inventive method the resources are data, especially data records. The method in accordance with the invention is also preferably used in a peer-to-peer-network, especially in a chord ring. In a further variant of the inventive method the ranges of values of indices which are assigned to the network nodes are determined using a hash function, for example SHA-1.

As well as relating to the method described above, an example embodiment of the invention further relates to a decentralized data network comprising a plurality of network nodes, with each network node being responsible for a range of values of indices and resources in the data network being assigned one or more keywords, with the data network being embodied such that the resources in the data network are distributed with a method in which:

a) The keyword or keyword of a respective resource is or are encoded in each case into a digital bit sequence;
b) One or more modifications of the digital bit sequence(s) of a respective resource are created by a modified bit sequence being created respectively from the digital bit sequence or bit sequences, with, in a modified bit sequence, the bits being replaced by new bits at predetermined bit positions of the respective digital bit sequence independently of the keyword encoded in accordance with the digital bit sequence;
c) The modified bit sequence or the totality of the modified bit sequences of a respective digital modification is mapped to the indices of the range of values of the network node such that, when there is a request by a network node for a resource by means of one or more truncated keywords, only in a part of the decentralized data network has to be searched for indices which correspond to the truncated keyword or keywords;
d) The respective resource is allocated the index to which the modified bit sequence or the totality of the modified bit sequence of the modification or of one of the modifications is embodied.

The data network is embodied is such cases so that each variant of an example embodiment of the inventive method described above is able to be executed in the data network. Example embodiments of the method can for example be executed by a predefined network computer in the data network. The invention also relates especially to a network computer for use in the data network, with the network computer being this pre-defined network computer.

An example embodiment of the invention further comprises a computer program product with program code stored on a machine-readable carrier for executing an example embodiment of the inventive method when the program is running on a computer.

BRIEF DESCRIPTION OF THE DRAWINGS

Example embodiments of the invention will be described in detail below with reference to the enclosed figures.

The figures show.

DETAILED DESCRIPTION OF THE EXAMPLE EMBODIMENTS

Figure 1:
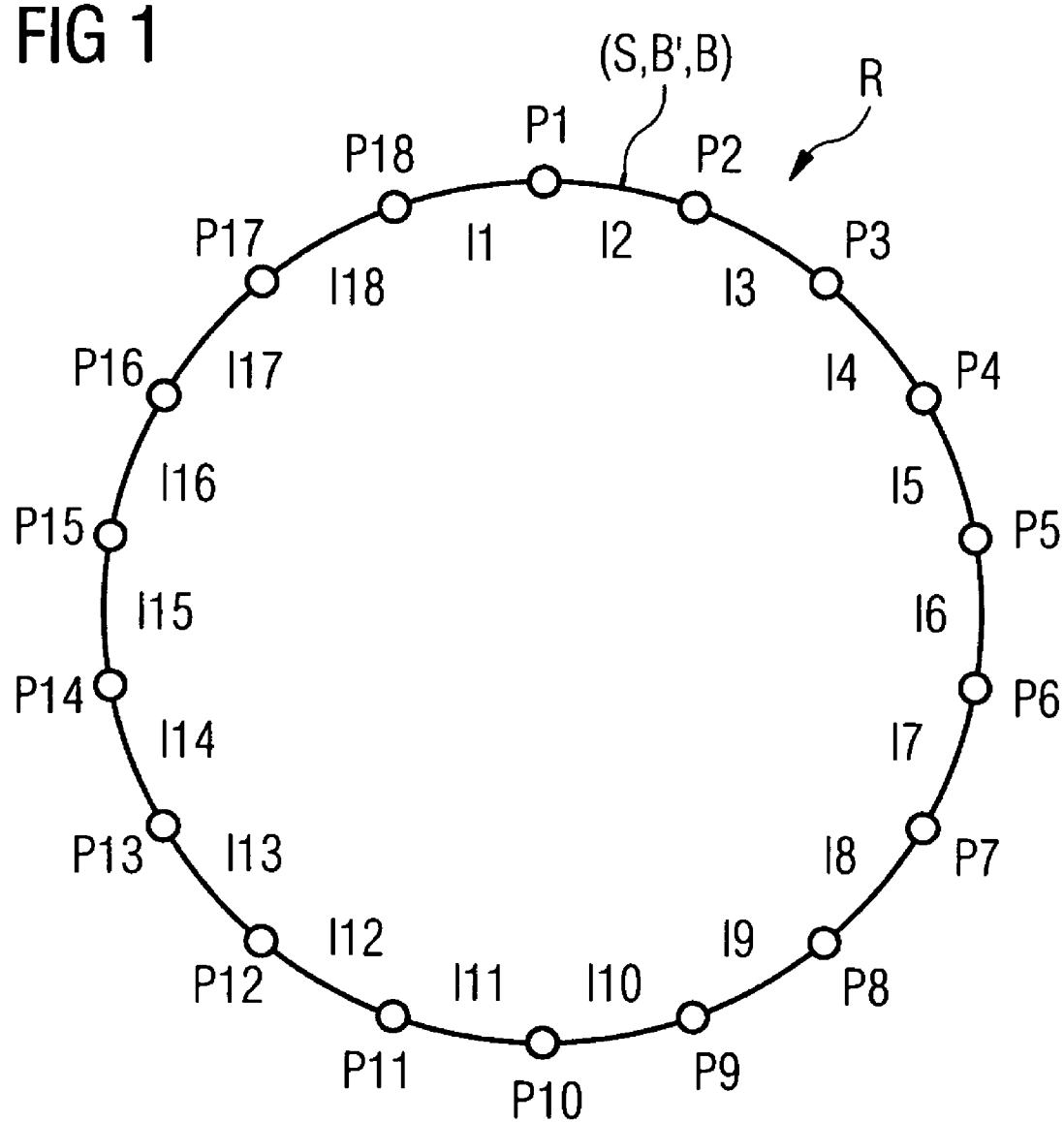
FIG. 1 a schematic diagram of a peer-to-peer-network in the form of a chord ring in which the method in accordance with an example embodiment of the invention can be executed.

Various example embodiments will now be described more fully with reference to the accompanying drawings in which only some example embodiments are shown. Specific structural and functional details disclosed herein are merely representative for purposes of describing example embodiments. The pre-sent invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region; layer, or section from another region, layer, or section. Thus, a first element, component, region, layer, or section discussed below could be termed a second element, component, region, layer, or section without departing from the teachings of the present invention.

FIG. 1 shows a schematic diagram of a peer-to-peer-network in the form of a chord ring R, with the ring 18 including network nodes in the form of peers P1, P2, . . . , P18. The chord ring R in this case represents an overlay network in which the individual peers are arranged on a ring structure next to each other. Each of the peers P1 to P18 is in this case assigned a corresponding interval I1, I2, . . . , I18 of indices, with these index intervals representing the ranges of values of Indices in the sense of the claims. The index intervals are allocated to the individual peers preferably by the application of a hash function, for example with the SHA-1 function sufficiently known from the prior art, to specific identity values of the peers, such as their IP addresses. In this case the overall interval of the possible indices is represented by the extent of the ring R and each peer is assigned an index to the ring with the hash function. A respective peer is then responsible for the interval of the indices, which extends from the index value of the peers with the next lowest number through to its own index value. The hash function in this case is locality-destroying, i.e. it does not possess any relationship between the structure of the identity value of the peer and the index created thereby on the ring R. In this way an even distribution of the peers on the ring is guaranteed.

In the network of FIG. 1 a plurality of resources is distributed between the peers, with the resources being data elements or data records for example. The resources can in this case by any types of data element, for example multimedia data or entries in telephone books. To make it possible for the peers to search for resources in the peer-to-peer-network, one or more keywords are assigned to each resource, which can be looked for by queries in the form of so-called lookups.

To publish a resource in the network of FIG. 1 the resource must be assigned to an index on the Ring R. The peer which is responsible for the range of values in which the index lies to which the resource is assigned is then responsible for this resource. In particular the resource is stored on this peer. The assignment of the resource to an index is undertaken in an example embodiment of the inventive method described below using an encoding of the corresponding keyword or keywords of the resource into digital bit sequences. The bit sequences are subsequently modified by the bits of the respective bit sequence being replaced from a predetermined bit position by randomly selected bits. Subsequently a mapping of the modified bit sequences to an index is undertaken with a locality-preserving space-filling curve. FIG. 1 shows by way of example an index between peer P1 and P2 marked on a ring R, with this Index being assigned a resource with an individual keyword S as well as the corresponding digital bit sequence B and modified bit sequence B'.

The keywords are given by a plurality of characters in accordance with a predefined alphabet, especially the Latin alphabet. The locality-retaining curve in this case partly receives the spaces between the keywords given by the lexicographic assignment of the predefined alphabet. This leads in conventional methods, in which no random replacement of bits of the encoded bit sequence B occurs, to frequently searched for similar keywords, for example in the search for frequently used similar surnames in a telephone book, essentially always being allocated to the same peer or peers, which leads to an uneven load distribution. The methods according to the prior art however have the advantage, of enabling, by preservation of the locality, a fast wildcard search for truncated keywords with little network traffic, since, by retaining the locality, a truncated search at a specific number of peers is already restricted in advance.

In order in accordance with one embodiment of the invention on the one hand to make an even load distribution and on the other also a wildcard search, a certain proportion of an encoded bit sequence of the keyword is replaced by random bits. This obtains an even distribution of the keywords, with the possibility of a wildcard search in part areas of the network being guaranteed. The greater in this case the number of randomly chosen bits, the more even is the load distribution, however this is at the expense of the speed of the wildcard search. The method in accordance with the invention thus creates a balance between an even distribution of resources and a fast wildcard search.

An embodiment of a method for distribution of resources in accordance with the prior art will be compared below with an embodiment in accordance with the invention.

In accordance with the publication process according to the prior art considered below, a resource is described by a keyword tuple with n keywords, with all keywords consisting of strings, which are formed from Unicode characters. For the allocation of the keywords to indices on a chord ring locality-preserving Hilbert curves of the order m=ceil(160/n) are used, which define a function $h[0, 2^{m-1}]^n \rightarrow [0, 2^{nm}-1]$. This function is the inverse of the function which is given by the Hilbert curve. The number 160 is thus the result of the standard SHA-1 hash function being used in the embodiment described here which uses 160-bit indices for determining the position of a peer on the ring. The function ceil(x) in this case corresponds to the smallest whole number which is equal to or greater than x.

In the method according to the prior art each character of a keyword is encoded into five bits, with the last five bits of the Unicode value of the character being used. These bit sequences for all characters of the keyword are then appended to each other and truncated to m bits or zero-filled in order to obtain precisely m bits. By encoding each keyword of a keyword tuple in the manner described above and by the application of the locality-preserving function h to the tuple of the resulting bit sequences with m bits in each case, a keyword tuple is mapped to a number with mn bits. By truncating the figure to 160 bits, provided mn>160, a mapping of the bit sequence tuple directly to an index of the ring is achieved. The resource is finally allocated to that peer which is responsible for the range of values in which the corresponding index lies.

Figure 2:
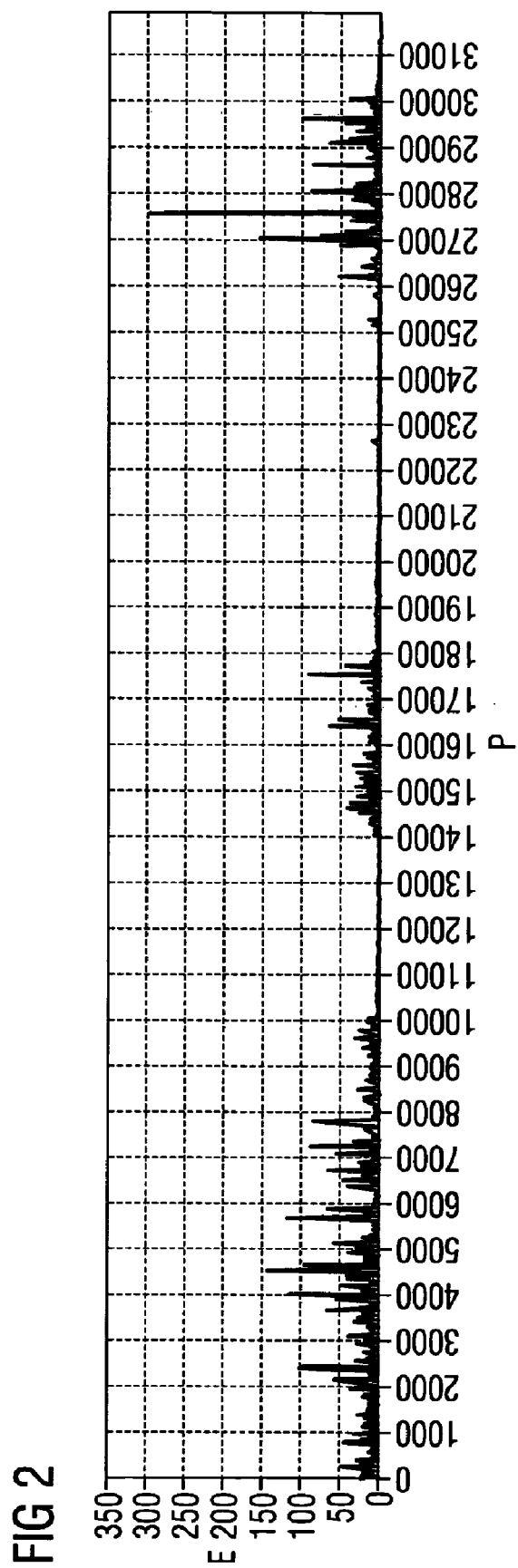
FIG. 2 a diagram which illustrates the distribution of resources in an embodiment in accordance with the prior art.

The method according to the prior art described above has been tested by the inventors for data from a telephone book. In this case 32,000 telephone book entries were used as the test data set, with these 32,000 entries being distributed on a peer-to-peer-network with likewise 32,000 peers. The peer indices were distributed equidistantly in this case, so that the peers are responsible for equal-sized ranges of values of the indices. The last name and the first name of a person entered in the telephone book are regarded as a keyword tuple in this case. FIG. 2 shows the distribution of the telephone book entries on the 32,000 peers in accordance with the method according to the prior art presented above. In the diagram shown in FIG. 2 in this case the numbers P of the peers are plotted along the abscissa and the ordinate shows the number E of telephone book entries for each peer. It can be seen that peers are present which are responsible for a large number of entries, in particular the maximum of 306 entries exists for a peer with a number between 27,000 and 28,000. The reason for this is that, in the distribution of keywords to the indices the space-filling Hilbert curve partly receives spacings between the keywords given by the lexicographical assignment of the predefined alphabet, which leads to very frequently used names such as "Miller" or "Smith" always being allocated to the same peers for example.

In accordance with the embodiment of the inventive method described below the originally created bit sequences of m bits are now modified such that, as from a predefined bit position, the bits are replaced by randomly selected bits, with the modified bit sequence subsequently being mapped by the Hilbert curve onto the index in a similar manner to the above method. The section which is replaced by such random bits can in such cases correspond to a number of complete characters, however any bit position can also be selected without considering the character length. In this way the locality-preserving effect of the Hilbert curve is weakened and the resources, i.e. the telephone book entries, are distributed over a wider area on the chord ring, so that a better load distribution is obtained.

Figure 3:
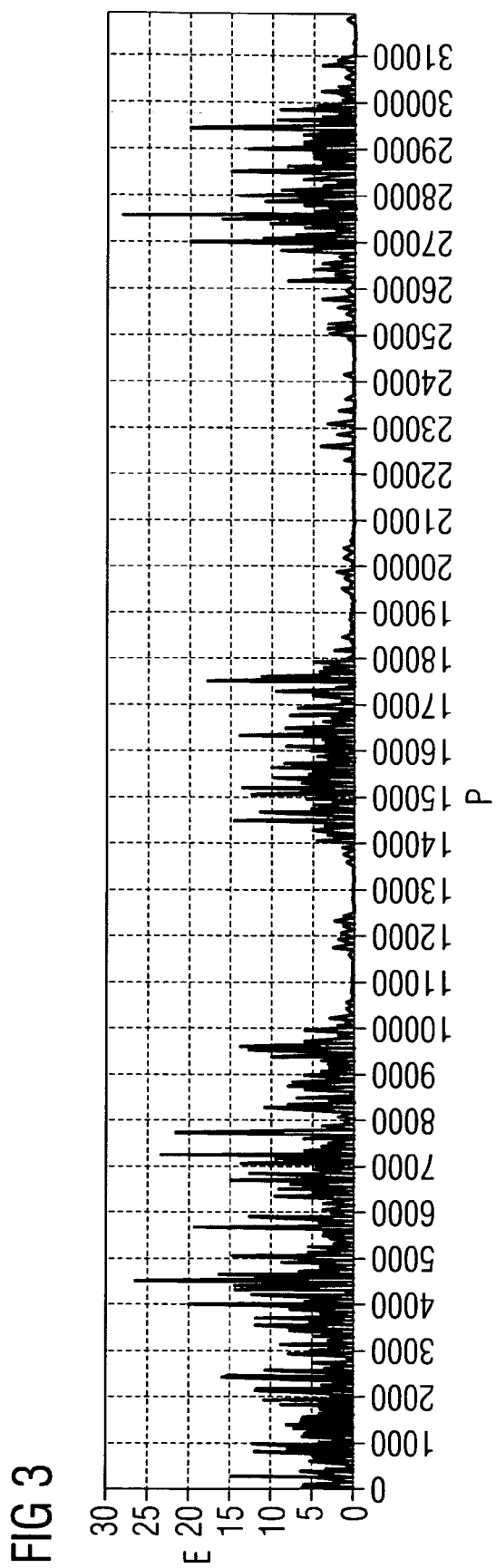
FIG. 3 a diagram which illustrates the distribution of resources in an embodiment of the inventive method.

FIG. 3, in a similar diagram to that depicted in FIG. 2, shows the distribution of the 32,000 telephone book entries E over the network of 32,000 peers In accordance with an embodiment of the invention. The last five bits of the bit sequence of the last name and of the first name have been replaced here by randomly selected bits. This produces an essentially even load distribution, with the maximum of the entries for which a peer is responsible now only being 28.

At least one embodiment of the inventive method described above can be expanded such that, instead of the random choice of bits, all possible combinations of modified bit sequences able to be created by variation of the bits to be replaced can be determined in the publication of the resources, with the corresponding index on the ring and thus the responsible peer being determined for each combination with space-filling curve. Finally that combination of modified bit sequences is used for publication of the resources which-leads to a minimization of the number of resources which are stored on the peers at any one time. This approach can be seen as an online optimization problem, since the resources are only partly known when the optimization is undertaken, with this problem being able to be solved by a simple greedy algorithm.

In a further variant there is the option that not all possible combinations of creatable modified bit sequences are considered, but merely a predetermined number of combinations, with each combination always being created at random. In this way the network traffic is reduced by comparison with the previously described variant.

LITERATURE REFERENCES

[1] Cristina Schmidt and Manish Parashar. Enabling flexible queries with guarantees in p2p system. IEEE. Internet Computing, 8(3):19-26, 2004

[2] Cristina Schmidt and Manish Parashar. Flexible Information Discovery in Decentralized Distributed system. In Proceedings of The Twelfth IEEE International Symposium on High Performance Distributed Computing (HPDC-12), June 2003, 226-235.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data-processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. Method for distribution of resources to network nodes in a decentralized data network including a plurality of network nodes, with each network node being responsible for a range of index values and each resource being assigned at least one keyword, the method comprising:

a) encoding the at least one keyword of a respective resource into a digital bit sequence;

b) creating at least one modification of the digital bit sequence of a respective resource by creating a modified bit sequence from the digital bit sequence with, in a modified bit sequence, the bits being replaced by new bits at defined bit positions of the respective digital bit sequence independent of the at least one keyword encoded in accordance with the digital bit sequence;

c) mapping at least one of the modified bit sequence and a totality of the modified bit sequences of a respective digital modification onto the indices of the ranges of values of the network node such that, when a network node requests a resource by way of at least one truncated keyword, a search only has to be made in a part of the decentralized data network for indices which correspond to the at least one truncated keyword; and d) allocating the respective resource to the index, onto which at least one of the modified bit sequence and the totality of the modified bit sequences, of at least one of the modification and one of the modifications, is mapped.

2. The method as claimed in claim 1, wherein, in step b) the bits of the respective digital bit sequence are replaced from a predefined bit position by new bits.

3. The method as claimed in claim 2, wherein, in step b), the bits are replaced at bit positions of the respective digital bit sequence by randomly selected bits.

4. The method as claimed in claim 1, wherein, in step b), the bits are replaced at bit positions of the respective digital bit sequence by randomly selected bits.

5. The method as claimed in claim 1, wherein, in step c) the mapping of at least one of the modified bit sequence and the totality of the modified bit sequences to the indices is undertaken by a space-filling curve.

6. The method as claimed in claim 5, wherein each resource is assigned a number of keywords and the keyword or keywords of a respective resource are encoded in digital bit sequences with a fixed bit length, with the space-filling curve having a dimension which corresponds to the number of keywords, and with the space-filling curve having an order which corresponds to the fixed bit length.

7. The method as claimed in claim 6, wherein the space-filling curve maps the at least one of modified bit sequence and totality of the modified bit sequences onto indices in the range $[0, \ldots, 2^{nb}-1]$, with n being the number of keywords and b the fixed bit length.

8. The method as claimed in claim 4, wherein the at least one keyword features one or more characters from an alphabet and wherein the space-filling curve partly receives the spacings between the keywords given by the lexicographical ordering of the alphabet.

9. The method as claimed in claim 5, wherein the space-filling curve is a Hilbert curve.

10. The method as claimed in claim 1, wherein the at least one keyword features one or more characters from an alphabet.

11. The method as claimed in claim 10, wherein each character of a respective keyword is encoded as a digital bit sequence with a number of bits and the encoded characters of the respective at least one keyword are arranged alongside one another, which creates a digital bit sequence in accordance with step a).

12. The method as claimed in claim 11, wherein, in step c) the mapping of at least one of the modified bit sequence and the totality of the modified bit sequences to the indices is undertaken by a space-filling curve.

13. The method as claimed in claim 12, wherein the space-filling curve partly receives the spacings between the keywords given by the lexicographical ordering of the alphabet.

14. The method as claimed in claim 10, wherein, in step c) the mapping of at least one of the modified bit sequence and the totality of the modified bit sequences to the indices is undertaken by a space-filling curve.

15. The method as claimed in claim 14, wherein the space-filling curve partly receives the spacings between the keywords given by the lexicographical ordering of the alphabet.

16. The method as claimed in claim 1, wherein in step b) a number of modifications are created and are mapped in step c) onto indices, with in step d) that index being allocated to the resource in accordance with one of the modifications which lies within the range of values of that network node which, in accordance with an optimality criterion, is the best-suited network node, with the optimality criterion being selected so that an even load distribution is obtained in the decentralized data network.

17. The method as claimed in claim 16 in which, in step d), that index is allocated to the resource which lies in the range of values of that network node which at that point in time has the lowest load of all or at least of a part of the network nodes determined by the number of modifications.

18. The method as claimed in claim 17, wherein the index to which the resource is allocated in step d) is determined by way of a greedy algorithm.

19. The method as claimed in claim 16, wherein the index to which the resource is allocated in step d) is determined by way of a greedy algorithm.

20. The method as claimed in claim 1, wherein the resources include data.

21. The method as claimed in claim 20, wherein the data are data records.

22. The method as claimed in claim 1, wherein the method is used in a peer-to-peer-network.

23. The method as claimed in claim 22, wherein the method is used in a chord ring.

24. The method as claimed in claim 1, wherein the ranges of values of indices which are assigned to the network nodes are determined via a hash function.

25. The method as claimed in claim 24, wherein the hash function is SHA-1.

26. A computer program product with program code stored on a machine-readable carrier for executing a method as claimed in claim 1 when the program is running on a computer.

27. A computer readable medium including program segments for, when executed on a computer device, causing the computer device to implement the method of claim 1.

28. A decentralized data network comprising a plurality of network nodes, with each network node being responsible for a range of values of indices and resources in the data network being assigned at least one keyword, with the data network being embodied such that the resources in the data network are distributed with a method in which:
 a) the at least one keyword of a respective resource is encoded into a digital bit sequence;
 b) at least one modification of the digital bit sequence of a respective resource is created by a modified bit sequence being created from the digital bit sequence or sequences with, in a modified bit sequence, the bits being replaced by new bits at bit positions of the respective digital bit sequence independent of the at least one keyword encoded in accordance with the digital bit sequence;
 c) at least one of the modified bit sequence and a totality of the modified bit sequences of a respective digital modification being mapped onto the indices of the ranges of values of the network node such that, when a network node requests a resource by way of at least one truncated keyword, a search only has to be made in a part of the decentralized data network for indices which correspond to the at least one truncated keyword; and
 d) the respective resource is allocated to the index onto which at least one of the modified bit sequence and the totality of the modified bit sequences, of at least one of the modification and one of the modifications, is mapped.

29. The data network as claimed in claim 28, wherein the data network is embodied so that the method is able to be executed in the data network.

30. The data network as claimed in claim 29, wherein the method is executed by a defined network computer in the data network.

31. A network computer for use in the data network as claimed in claim 30, with the network computer being the defined network computer.

32. The data network as claimed in claim 28, wherein the method is executed by a defined network computer in the data network.

33. A network computer for use in the data network as claimed in claim 32, with the network computer being the defined network computer.

* * * * *